United States Patent
Robinson

(10) Patent No.: US 9,172,598 B2
(45) Date of Patent: Oct. 27, 2015

(54) SCALABLE RELIABLE FAILOVER IN A NETWORK

(71) Applicant: Pravala, Inc., Kitchener (CA)

(72) Inventor: Robert Robinson, Waterloo (CA)

(73) Assignee: Pravala Inc., Kitchener, Ontario (CA)

( * ) Notice: Subject to any disclaimer, the term of this patent is extended or adjusted under 35 U.S.C. 154(b) by 0 days.

(21) Appl. No.: 14/100,351

(22) Filed: Dec. 9, 2013

(65) Prior Publication Data

US 2014/0092727 A1    Apr. 3, 2014

Related U.S. Application Data

(63) Continuation of application No. 13/104,669, filed on May 10, 2011, now Pat. No. 8,630,165.

(60) Provisional application No. 61/333,037, filed on May 10, 2010.

(51) Int. Cl.
*G01R 31/08* (2006.01)
*H04L 12/24* (2006.01)
*H04L 12/46* (2006.01)
*H04L 29/12* (2006.01)

(52) U.S. Cl.
CPC ........ *H04L 41/0654* (2013.01); *H04L 12/4633* (2013.01); *H04L 41/0663* (2013.01); *H04L 61/2061* (2013.01)

(58) Field of Classification Search
CPC ........................................................ H04L 4/00
USPC ......... 370/242, 245, 535, 907, 351, 219, 392, 370/389, 401
See application file for complete search history.

(56) References Cited

U.S. PATENT DOCUMENTS 7,042,838 B1 *    5/2006    Shand et al. .................. 370/225
7,675,859 B2 *    3/2010    Takase et al. .............. 370/236.2

* cited by examiner

*Primary Examiner* — Iqbal Zaidi

(57) ABSTRACT

A method is provided for establishing a reliable communication channel between an encapsulation node and a cluster of decapsulation nodes across a communication network. The method is implemented at the encapsulation node and comprises the following steps. A primary session is initialized with a primary decapsulation node in the cluster of decapsulation nodes during which an assigned address is received. A redundant session is initialized with a redundant decapsulation node in the cluster of decapsulation nodes. Data is transmitted to and received from the decapsulation node until a failure is detected. Once the failure is detected, data is transmitted to and received from the redundant decapsulation node instead of the primary decapsulation node.

17 Claims, 5 Drawing Sheets

SCALABLE RELIABLE FAILOVER IN A NETWORK

The present invention relates generally to fault-tolerant networks and specifically to a providing an improved, scalable failover network architecture for tunnel endpoints. This application is a continuation of U.S. patent application Ser. No. 13/104,669 filed May 10, 2011 entitled "SCALABLE RELIABLE FAILOVER IN A NETWORK", which claims priority to U.S. Provisional Application No. 61/333,037 filed May 10, 2010.

BACKGROUND

A tunnel is a network communications channel between two endpoints in a network and is used to transport data by encapsulation of its packets. Internet Protocol (IP) tunnels are often used for connecting two disjoint IP networks that do not have a native routing path to each other, via an underlying routable protocol across an intermediate transport network.

In conjunction with an encryption protocol, such as the IP Security (IPsec) protocol or other known or proprietary encryption protocols, tunnels may be used to create a virtual private network between two or more private networks across a public network such as the Internet.

Accordingly, an encapsulation node and a decapsulation node are provided. The encapsulation node is used to encapsulate data to facilitate communication over the network and is often implemented at a client. The decapsulation node is used to decapsulate the data received from the encapsulation node and is implemented at point in the network that is connected to a next hop destination of the encapsulated data. Thus the decapsulation node can be implemented at a server or at a router within the network. If the decapsulation node is not a target destination server for the data, the decapsulation node further transmits the data to the target destination server via a private or public network, such as the Internet.

Communication between the encapsulation node and the decapsulation node may include one or more authentication sessions, encryption-algorithm negotiations, or other configuration steps before they are ready to transfer data.

The client needs the decapsulation node to remain active in order to be able to communicate with the target destination server. Accordingly, a number of different failover solutions have been implemented. Failover refers to the capability of a computing device to automatically switch to a redundant device upon the failure of the device being used.

Approaches that utilize a stateless transport layer, either directly using IP or wrapping a payload in User Datagram Protocol (UDP), can potentially utilize existing IP-redundancy protocols such as Hot Standby Router Protocol (HSRP) or Virtual Routing Redundacy Protocol (VRRP). In such an environment, two decapsulation nodes are configured to share a single IP address, with the primary decapsulation node receiving all traffic and the standby configured to take over should the primary fail.

However, it is only possible for a single decapsulation node to be the primary server for a specific IP address. Load balancing across HSRP or VRRP requires multiple IP addresses configured on the cluster with each decapsulation node assigned as primary to one of the addresses. This complicates configurations with more than a single decapsulation node because it is necessary to load balance clients across the IP addresses exposed by the system.

Further, the IP-redundancy techiques described above do not work with systems that utilize a stateful transport layer. There is no widely supported mechanism to migrate the state of a Transmission Control Protocol (TCP) connection between operating-system instances. To allow TCP connections to be migrated between independent operating system instances, Fault-Tolerant TCP (FT-TCP) was introduced. FT-TCP combines traditional IP failover protocols with a new component that sits both above and below the existing TCP stack to intercept all packets being send and received using TCP. Thus a redundant decapsulation node can be provided that is maintained in the same state as the primary server. However, supporting this protocol requires tight coupling between the primary decapsulation node and the redundant decapsulation node. Further, it requires a dedicated redundant decapsulation node, which tends not to scale in an efficient manner.

Thus, the solutions currently available for decapsulation node failover are limited in that they do not scale well and require tight control, which often leads to custom equipment requirements, thereby increasing the costs and complexity. Accordingly, it is an object of the present invention to obviate or mitigate at least some of these disadvantages.

SUMMARY OF THE INVENTION

In accordance with an aspect of the present invention there is provided a method for establishing a reliable communication channel between an encapsulation node and a cluster of decapsulation nodes across a communication network, the method, implemented at the encapsulation node, comprising the steps of: initializing a primary session with a primary decapsulation node in the cluster of decapsulation nodes, including receiving an assigned Internet Protocol (IP) address; initializing a redundant session with a redundant decapsulation node in the cluster of decapsulation nodes; transmitting data to and receiving data from the decapsulation node until a failure is detected; and upon detection of the failure, transmitting data to the redundant decapsulation node instead of the primary decapsulation node.

In accordance with an aspect of the present invention there is provided a method for establishing a reliable communication channel between a decapsulation node among a cluster of decapsulation nodes and an encapsulation node across a communication network, the method, implemented at the decapsulation node, comprising the steps of:

establishing a session with the encapsulation node in response a request therefrom, the request indicating whether or not the decapsulation node is to be a primary decapsulation node or a redundant decapsulation node; and if the decapsulation node is to be the primary decapsulation node: selecting an IP address for the encapsulation node; transmitting the selected IP address to the encapsulation node; and transmitting data to and receiving data from the encapsulation node until a failure occurs; if the decapsulation node is to be the redundant decapsulation node: maintaining the session until the failure occurs; and after the failure occurs transmitting data to and receiving data from the encapsulation node.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
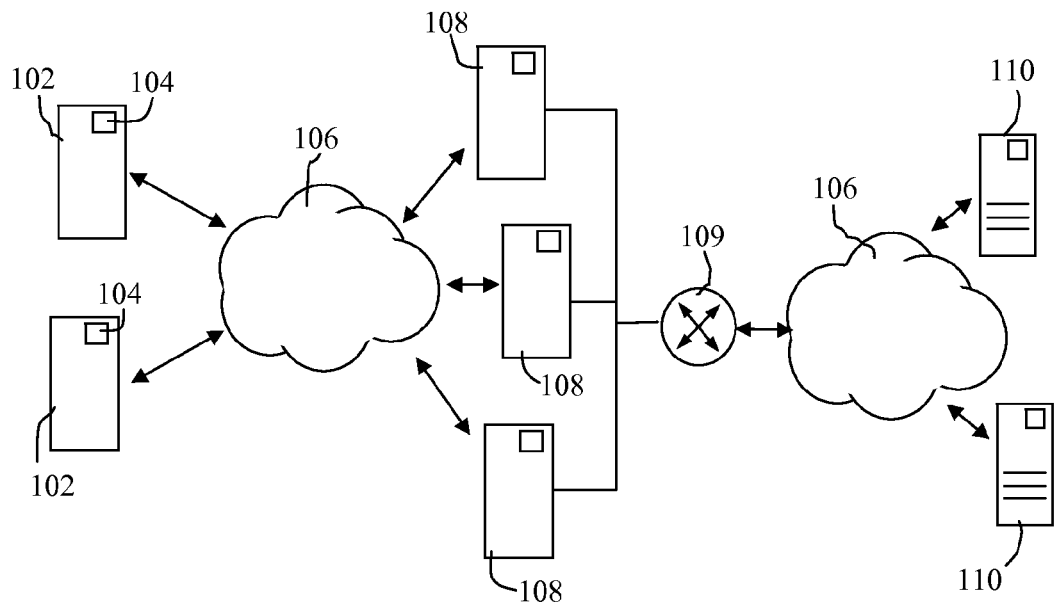
FIG. 1 is a block diagram illustrating a network infrastructure in accordance with an embodiment of the present invention.

For convenience, like numerals in the description refer to like structures in the drawings. Referring to FIG. 1, a network architecture is illustrated generally by numeral 100. The network architecture includes a plurality of clients 102, a plurality of encapsulation nodes 104, a communication network 106, a plurality of decapsulation nodes 108, a router 109 and a plurality of target destination servers 110.

The clients 102 may include both wired and wireless computing devices such as a desktop computer, a notebook, a tablet or other portable computer, a smart phone, a personal digital assistant (PDA), and the like. Each client 102 includes an encapsulation node 104. Each encapsulation node 104 is configured to encapsulate data in a proprietary format or in a format that is known in the art. Each encapsulation node 104 further includes redundancy software configured to establish and manage redundant connections with a plurality of the decapsulation nodes 108.

The communication network 106 may include a wide area network (WAN) and/or a local area network (LAN). This includes, for example, public networks such as the Public Switched Telephone Network (PSTN) and the Internet, as well as private networks or Intranets. The actual configuration of the communication network 106 may vary, depending on the implementation, as will be appreciated by a person of ordinary skill in the art.

Each decapsulation node 108 is configured to decapsulate data received from a corresponding one of encapsulation nodes 104. Each decapsulation node 108 is further configured to route the decapsulated data to the target destination server 110 via the router 109. Depending on the implementation, the decapsulation node 108 and the target destination server 110 may be implemented by the same device. Alternatively, the decapsulation node 108 may communicate directly with the target destination server 110. Yet alternatively, the decapsulation node 108 may communicate with the target destination server 110 via the communication network 106. In this implementation, the decapsulation node 108 may encapsulate the data before transmitting it to the target destination server 110.

The network architecture 100 above is described with reference to data flowing from the client 102 to the target destination server 110. It will be appreciated by a person of ordinary skill in the art that the target destination server 110 can provide a response to the data it receives. In such a case, the decapsulation node 108 will actually encapsulate the response and the encapsulation node 104 will decapsulate the response.

Figure 2A:
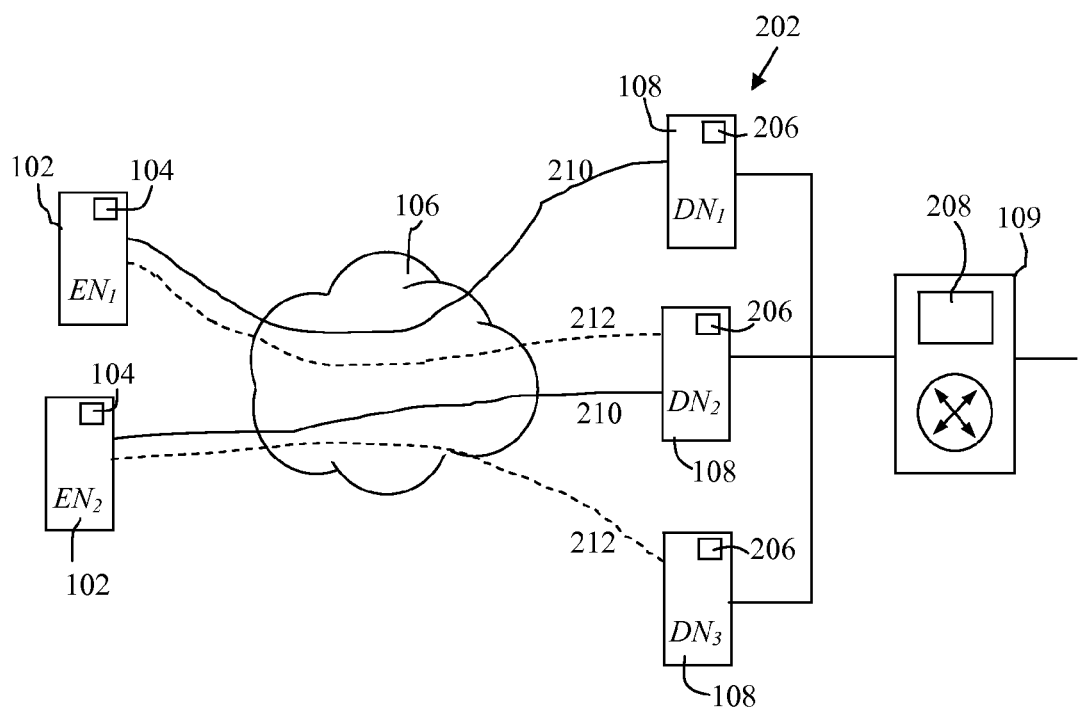
FIG. 2a is a block diagram illustrating further aspects of the network infrastructure of FIG. 1.

Referring to FIG. 2a, a block diagram illustrating a sample configuration of the network architecture is shown generally by numeral 200. In FIG. 2, the encapsulation nodes 104 and the decapsulation nodes 108 are shown in relative isolation. In this example, two encapsulation nodes 104 are provided and represented as $EN_1$ and $EN_2$. A robust decapsulation node cluster 202 includes three decapsulation nodes 108, which are represent as $DN_1$, $DN_2$ and $DN_3$, a router 109, a decapsulation node failure detector 206 (DN-FD) and an encapsulation node-decapsulation node (EN-DN) mapping table 208.

Each encapsulation node 104 establishes a plurality of sessions with a corresponding plurality of decapsulation nodes 108. The plurality of sessions includes a primary session 210 with a primary decapsulation node 108 and at least one redundant session 212 with a redundant decapsulation node 108. Each redundant decapsulation node 108 can be used as a primary decapsulation node 108 for other encapsulation nodes 104.

Further, each of the decapsulation nodes 108 is assigned a range of IP addresses for distribution to corresponding encapsulation nodes 104. The EN-DN mapping table identifies which decapsulation node 108 is responsible for which range of addresses. Thus, when data is returned from the target destination server 110 to the router 109, the router can properly identify the corresponding decapsulation node 108.

The number of redundant sessions established by each encapsulation node 104 depends, at least in part, on the number of decapsulation node failures expected by the system. Therefore, the more robust the decapsulation nodes 108 are, the fewer the number of redundant sessions and redundant decapsulation nodes 108 that are required. Further, the number of redundant sessions established by the encapsulation node 104 may also depend, at least in part, on how quickly additional redundant sessions can be established. Thus, the faster an additional redundant session can be established, the fewer the number of simultaneous redundant sessions need to be established. Accordingly, the number of redundant sessions established by the encapsulation node is a design choice that can vary depending on the implementation.

Thus, it is for ease of explanation only, that the present embodiment is described with reference to the two encapsulation nodes ($EN_1$ and $EN_2$) 104, the three decapsulation nodes ($DN_1$, $DN_2$ and $DN_3$) 108 and the one redundant session per encapsulation node 104.

In the present embodiment, the DN-FD 206 is a piece of software that runs on each decapsulation node 108 and monitors the state of the system to detect component failures. The DN-FD 206 is independent of the specific encapsulation system and thereby can be utilized across different encapsulation implementations. The design and implementation of the DN-FD 206 can leverage much of the research that has already been done in this field.

Upon detection of a failure, the DN-FD 206 forcibly terminates the faulty decapsulation node 108 and restarts it after a predefined restart time. The restart time will depend upon the number of different factors, as will be appreciated by a person of ordinary skill in the art. For example, some of these factors may include previous failures, the load on the system, and other detected hardware issues, if any, the number of redundant decapsulation nodes 108, network state and the like.

In the present embodiment, the EN-DN mapping table 208 is implemented as a distributed data store at the router 109 and is both written to and read from by the decapsulation nodes 108. The EN-DN mapping table 208 is structured much like a traditional routing table so a dynamic routing protocol can be used to implement it. In the present embodiment, the Open Shortest Path First (OSPF) protocol is used. Utilizing an existing distributed data store reduces the chances of introducing additional software failures, since OSPF implementations are relatively common and used by a large number of other systems. As will be appreciated by a person of ordinary skill in the art, other proprietary or known routing algorithms, such as the Routing Information Protocol (RIP) or the Intermediate System to Intermediate System (IS-IS) protocol, for example, may also be used.

The EN-DN mapping table 208 maintains connectivity information for each of the decapsulation nodes 108. This information can be used to detect failures. Once a primary decapsulation node 108 fails, all of the primary encapsulation nodes 104 assigned to that decapsulation node 108 will migrate to other, functioning decapsulation nodes 108, as will be described. This allows the encapsulation nodes 104 to continue operation with the same IP addresses even in the event of a decapsulation node 108 failure.

Figure 3:
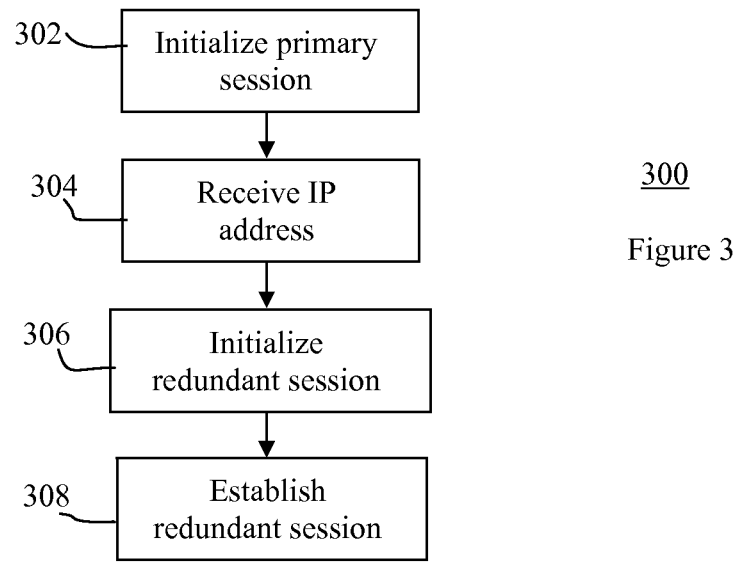
FIG. 3 is a flow chart illustrating the steps taken by an encapsulation node to establish a session.

Referring to FIG. 3, a flow chart illustrating steps taken by the each encapsulation node 104 to establish a connection with a primary decapsulation node 108 and a redundant decapsulation node 108 is shown generally by numeral 300.

At step 302, the encapsulation node $EN_1$ initializes a primary session with a primary decapsulation node $DN_1$. As will be appreciated by a person of ordinary skill in the art, this session can be established using known or proprietary handshaking protocols. Further, as part of the initialization, the encapsulation node $EN_1$ provides the identification of a redundant decapsulation node $DN_2$. At step 304, the encapsulation node $EN_1$ receives an assigned IP address from the primary decapsulation node $DN_1$ and the primary session is established.

At step 306, the encapsulation node $EN_1$ initializes a redundant session with the redundant decapsulation node $DN_2$. As will be appreciated by a person of ordinary skill in the art the redundant session can be established using known or proprietary handshaking protocols. Further, as part of the initialization, the encapsulation node $EN_1$ provides the assigned IP address to the redundant decapsulation node $DN_2$. The encapsulation node $EN_1$ identifies that the connection is a redundant connection and, optionally, provides the identification of the primary decapsulation node $DN_1$ to the redundant decapsulation node $DN_2$. At step 308, the redundant session between the encapsulation node $EN_1$ and the redundant decapsulation node $DN_2$ is established.

Figure 4:
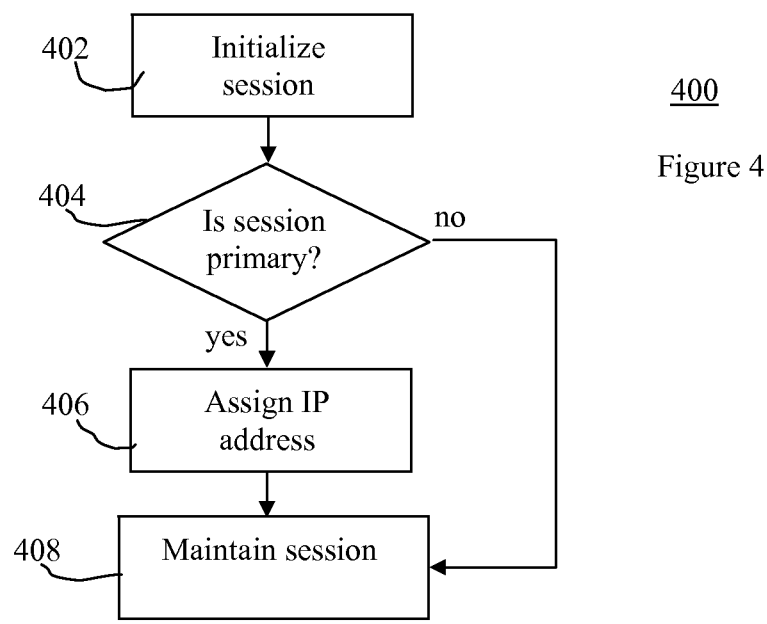
FIG. 4 is a flow chart illustrating the steps taken by a decapsulation node to establish a session.

Referring to FIG. 4, a flow chart illustrating steps taken by each decapsulation node 108 to establish a connection with the encapsulation nodes 104 is shown generally by numeral 400.

At step 402, the decapsulation node 108 initializes a session in response to a request from the encapsulation node $EN_1$. At step 404, the decapsulation node 108 determines whether or not the session is to be a primary session or a redundant session. As described with reference to FIG. 3, at step 306, in the present embodiment the decapsulation node 108 is informed by the encapsulation node 104 whether the session is to be a primary session or a redundant session. If the session is to be a primary session, the decapsulation node 108 continues at step 406. If the session is to be a redundant session, the decapsulation node 108 continues at step 408.

At step 406, the decapsulation node 108 assigns an IP address to the encapsulation node. As previously described, each of the decapsulation nodes 108 is assigned a range of IP addresses for distribution to corresponding encapsulation nodes 104. The range of IP address is further categorized into a plurality of sub-ranges of IP addresses. The sub-ranges of IP addresses are determined, at least in part, based on the number of other decapsulation nodes 108. Each sub-range of IP addresses is associated with a corresponding one of the other decapsulation nodes 108. The IP address assigned to the encapsulation node is determined, at least in part, on the identity of it redundant decapsulation node 108.

Continuing the previous example, there are three decapsulation nodes 108, one primary session and one redundant session. For each decapsulation node 108 that is used for the primary session there are two possible redundant decapsulation nodes 108 that can be used for the redundant session. Accordingly, two sub-ranges of IP addresses are defined. Each of the sub-ranges of IP addresses is associated with a corresponding one of the possible redundant decapsulation nodes 108.

For example, assuming the first decapsulation node $DN_1$ is assigned an IP address range comprising addresses 172.20.0.0/24. The IP address range is further broken down into a first sub-range comprising addresses 172.20.0.0/25 and a second sub-range comprising addresses 172.20.0.128/25. In this example, the range of IP addresses are distributed evenly amongst the sub-ranges of IP addresses, although that need not be the case. The first sub-range is associated with the second decapsulation nodes $DN_2$ and the second sub-range is associated with the third decapsulation nodes $DN_3$.

Thus, if the encapsulation node 104 has informed the first decapsulation node $DN_1$ that its redundant decapsulation node 108 is the second decapsulation nodes $DN_2$, the IP address is selected from available IP addresses in the first sub-range of IP addresses. Similarly, if the encapsulation node 104 has informed the first decapsulation node $DN_1$ that its redundant decapsulation node 108 is the third decapsulation nodes $DN_3$, the IP address is selected from available IP addresses in the second sub-range of IP addresses.

The decapsulation node 108 continues at step 408 and maintains the session until it is terminated or until a failure occurs.

Figure 2B:
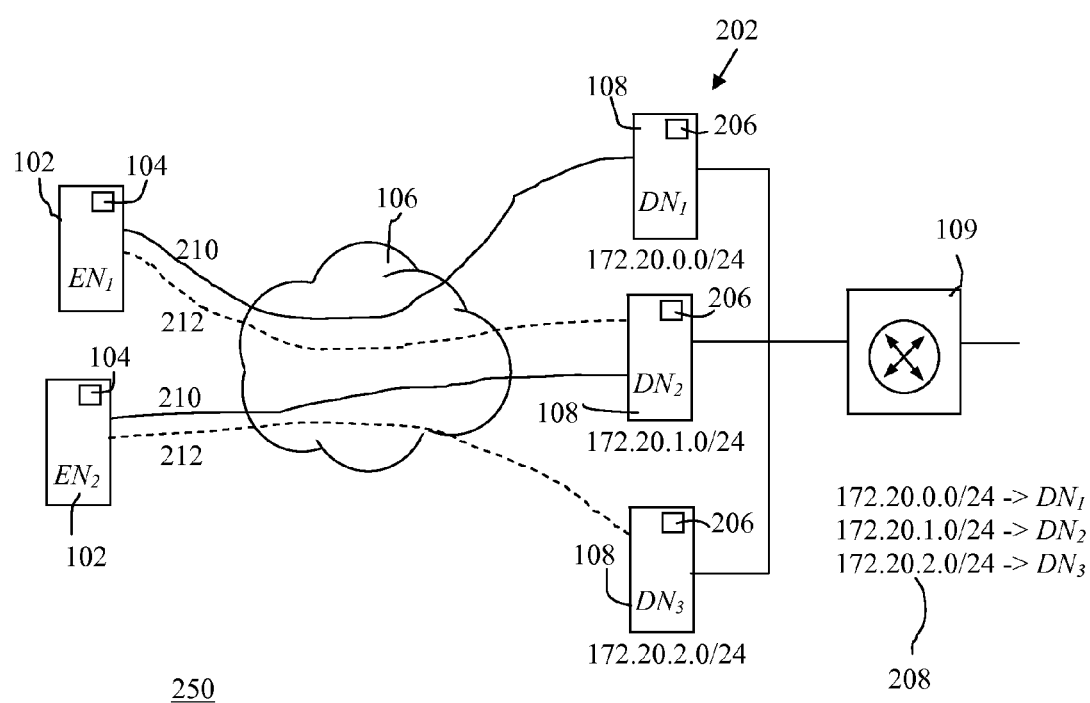
FIG. 2b is a block diagram illustrating the network infrastructure of FIG. 2a just prior to a network failure.
Figure 2C:
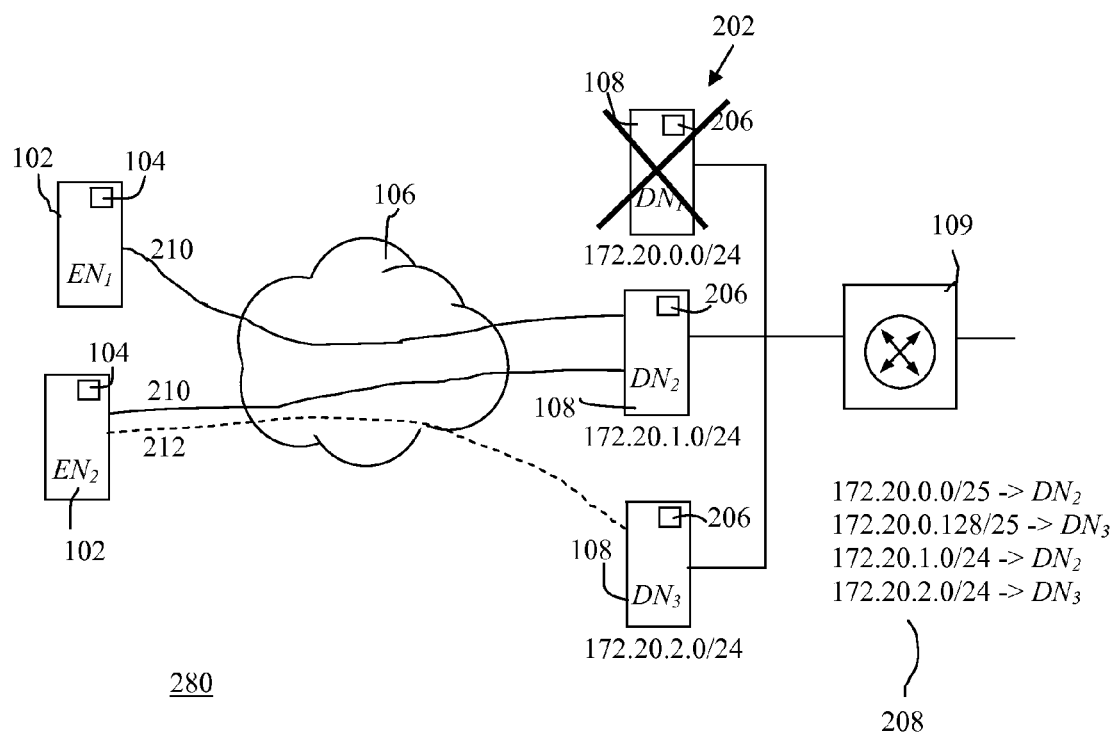
FIG. 2c is a block diagram illustrating the network infrastructure of FIG. 2a just after a network failure.

Referring to FIGS. 2b and 2c, a more detailed view of the network configuration of FIG. 2a, just prior to, and just post, a decapsulation node failure are shown generally by numerals 250 and 280 respectively. Specifically, FIGS. 2b and 2c are used to exemplify what would happen if the first decapsulation node $DN_1$ fails.

As illustrated in FIG. 2, and continuing the example discussed above, the first encapsulation node $EN_1$ has established a primary connection with the first decapsulation node $DN_1$ and a redundant connection with decapsulation node $DN_2$. The primary decapsulation node $DN_1$ is associated with the address range of 172.20.0.0/24 in the EN-DN mapping table 208. Accordingly, the primary decapsulation node $DN_1$ assigned the first encapsulation node $EN_1$ with the IP address 172.20.0.56.

At some point, the primary decapsulation node fails. In the present embodiment there are two approaches for the first encapsulation node $EN_1$ to detect failure of the first decapsulation node $DN_1$. In a first approach, the first encapsulation node $EN_1$ itself detects the decapsulation node failure. For example, in the event of a software failure, the first decapsulation node $DN_1$ returns a Port Unreachable message to the first encapsulation node $EN_1$. In the event of a hardware failure, after a predefined number of time-outs, the first encapsulation node $EN_1$ can presume that the first decapsulation node $DN_1$ has failed. Schemes for determining hardware failure are known in the art.

In a second approach, the redundant decapsulation node $DN_2$ notifies the first encapsulation node $EN_1$ that the first decapsulation node $DN_1$ has failed. This approach requires additional complexity in the robust decapsulation node 202, since it requires communication between the decapsulation nodes for recognition of a failure. A sample monitoring strategy is described as follows. For a decapsulation node 108 that is acting as a redundant decapsulation node $DN_2$ to one or more encapsulation nodes $EN_1$, the decapsulation node $DN_2$ monitors all of the decapsulation nodes 108 that are identified as primary decapsulation nodes $DN_1$ of the one or more encapsulation nodes $EN_1$. If an error occurs, the redundant decapsulation node $DN_2$ notifies the encapsulation node $EN_1$ of the failure.

As will be appreciated by a person of ordinary skill in the art, one or both of these approaches, or a hybrid-implementation thereof may also be used.

Regardless as to how the failure is detected, once the primary decapsulation node $DN_1$ fails, the encapsulation node $EN_1$ selects one of its redundant decapsulation nodes, in this case decapsulation node $DN_2$, to take over and begins sending all of its traffic to this decapsulation node $DN_2$. Since the decapsulation node $DN_2$ has already been initialized, there is minimal delay making a switch.

When the redundant decapsulation node $DN_2$ begins receiving traffic from the encapsulation node $EN_1$, it marks itself as the primary decapsulation node 108 and updates the EN-DN mapping table 208 with temporary routing information accordingly. That is, the EN-DN mapping table 208 is updated to reflect that IP address 172.20.0.56 is temporarily associated with the second decapsulation node $DN_2$. Thus, the router 109 can properly route data to the encapsulation node $EN_1$ via the decapsulation node $DN_2$ without a substantial interruption of service. While some data may be lost during the switch between decapsulation nodes 108, this likely constitutes a small fraction of all the data that is transmitted during the life of a typical session. This may be partially remedied by buffering at the encapsulation node $EN_1$ if packet loss is found to be a substantial issue.

Further, as previously described, all IP addresses in the same sub-range of IP address 172.20.0.0/25 are assigned to encapsulation nodes 104 having a common primary decapsulation node 108 and a common redundant decapsulation node 108. Accordingly, when the routing information update for the individual IP address 172.20.0.56 is made to the EN-DN mapping table, routing information for the entire first sub-range of IP addresses to which it belongs, that is 172.20.0.0/25, is updated to reflect that the first decapsulation node $DN_1$ has failed. Accordingly, packets for all IP address in the first sub-range are routed through the second decapsulation node $DN_2$. Further, the third decapsulation node $DN_3$ can be updated with information of the failure and the second sub-range of IP addresses associated it, that is 172.20.0.128/25, is updated to reflect that the first decapsulation node $DN_1$ has failed. Accordingly, packets for all IP address in the second sub-range are routed through the third decapsulation node $DN_3$.

This reduces the potential overhead that may be encountered when a decapsulation node 108 fails. Further, this may reduce data loss for other encapsulation nodes 104 that use the first decapsulation node $DN_1$ as a primary decapsulation node.

That is, for the other encapsulation nodes 104, the switch to the redundant decapsulation node $DN_2$ may occur while the primary connection is idle.

Optionally, once the first encapsulation node $EN_1$ starts using the second decapsulation node $DN_2$ as a temporary primary decapsulation node, the third decapsulation node $DN_3$ can be set up as a temporary redundant decapsulation node in case the second decapsulation node $DN_2$ fails.

When the first decapsulation node $DN_1$ fails, automatic and/or manual efforts are made to recover it. For example, the DN-FD 206 attempts to recover the first decapsulation node $DN_1$ by terminating and restarting it. However, if the DN-FD 206 cannot recover the first decapsulation node $DN_1$, other methods of recovery, either known or proprietary, may be used. This may include a possible service call by a technician.

Once the first decapsulation node $DN_1$ recovers, two of the elements to consider are how the it handles new clients and how it migrates back encapsulation nodes 104 that previously used it.

When the first decapsulation node $DN_1$ starts after recovery, it reads the EN-DN mapping table 208 and notes any addresses from its IP address range that are currently in use by other decapsulation nodes 108. It then ensures that it does not assign any of these addresses to newly connecting encapsulation nodes 104. When the second decapsulation node $DN_2$, which is temporarily handling clients that are not part of its primary subnet, notices that the first decapsulation node $DN_1$ has recovered, it informs the first encapsulation node $EN_1$ accordingly.

The first encapsulation node $EN_1$ uses this information to establish a new primary session with the first decapsulation node $DN_1$. Once the initialization is complete, the session is identified as the primary session and the second decapsulation node $DN_2$ is updated. Upon receiving this message, the second decapsulation node $DN_2$ modifies the EN-DN mapping table 208, thereby returning to the default IP address routing. Further, if a temporary redundant session was established with the third decapsulation node $DN_3$, that session can be terminated.

Accordingly, it will be appreciated that by configuring the client with a portion of failover logic the client can connect to an arbitrary number of servers that do not need to be directly synchronized with each other. Further, the solution described herein can be scaled to a large number of servers without requiring complex server-side logic or configuration parameters to support.

In the present embodiment, the encapsulation node is provisioned with the identity of the primary decapsulation node and the one or more redundant decapsulation nodes. However, other implementations are also possible. For example, in an alternate embodiment, the primary decapsulation node can assign one or more redundant decapsulation nodes to the encapsulation node. In yet an alternate embodiment, a central decapsulation node manager can be implemented. The central decapsulation node manager can be used to assign the primary decapsulation node, the one or more redundant decapsulation nodes, or both to an encapsulation node. In these alternate embodiments, some form of load balancing can also be implemented to distribute access to the decapsulation nodes.

Further, in the embodiments described above, the range of IP address assigned to each decapsulation node is categorized into sub-ranges of IP addresses. The IP address in each sub-range of IP addresses are distributed based on the identity of the redundant decapsulation node of the requesting encapsulation node. If no IP address is available in the sub-range associated with the identified redundant decapsulation node, the primary decapsulation node suggests and alternative redundant decapsulation node for which an IP address is available. Further, in an alternate embodiment, no such categorization occurs.

Figure 5:
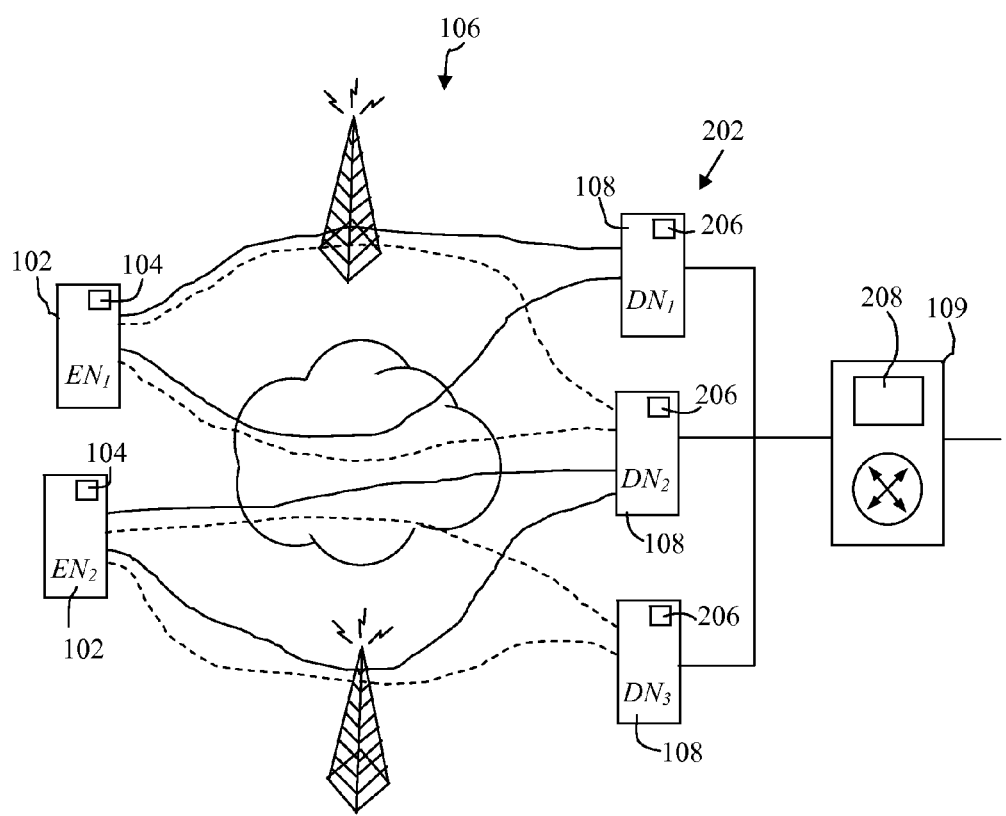
FIG. 5 is a block diagram illustrating the network infrastructure of FIG. 2a illustrating the case when the encapsulation node establishes two sessions with each corresponding decapsulation node.

Yet further, although the previous embodiments are described with reference to a single connection between the encapsulation node 104 and the decapsulation node 108, multiple connections between the two can also be facilitated. For example, U.S. patent application Ser. No. 13/004,652 filed Jan. 11, 2011, titled "COMMUNICATION BETWEEN CLIENT AND SERVER USING MULTIPLE NETWORKS" describes a system in which the encapsulation node (the client) communicates with the decapsulation node (bandwidth aggregations server) via at least two network paths. Referring to FIG. 5, a sample configuration of the network infrastructure is illustrated generally by numeral 500. In this example, a first network path can be via a cellular communication network 502 and a second communication path can be a Wi-Fi communication path 504. Accordingly, for such an implementation, each encapsulation node 104 would establish primary sessions with a corresponding primary decapsulation node 108 for each of the network paths. Similarly, each encapsulation node 104 would establish redundant sessions with a corresponding redundant decapsulation node 108 for each of the network paths.

The cellular communication network is shown separately from the Wi-Fi network 504 for illustrative purposes only to emphasize that there are two separate paths between the encapsulation nodes 104 and the decapsulation nodes 108. A person of ordinary skill in the art will appreciate that these are just two examples of networks that can make up the communication network 106.

In the embodiments described above, the client 102 includes the encapsulation node 104. Alternatively, the encapsulation node 104 could be implemented on another piece of equipment in the network. For example, if the client 102 is a desktop computer, the encapsulation node 104 can be implemented on an edge router coupled to the desktop computer. As another example, the encapsulation node 104 can also be implemented on a piece of network equipment through which one or more clients 102 connect. Accordingly, it will be appreciated that, like the decapsulation node 108, the encapsulation node 104 can be implemented at a variety of different endpoints within a network.

Yet further, in the embodiments described above the EN-DN mapping table 208 is implemented as a routing table. However, other data store implementations may also be used, as will be appreciated by a person of ordinary skill in the art. For example, rather than a routing table, the EN-DN mapping table 208 can use the Chubby lock service implemented by Google, Inc.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. The client device 102 does not need to be mobile and the first and second access points 104 and 106 do not need to provide a wireless connection to the network.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

What is claimed is:

1. A method for establishing a reliable communication channel between an encapsulation node and a cluster of decapsulation nodes across a communication network, the method, implemented at the encapsulation node, comprising:
    initializing a primary session with a primary decapsulation node in the cluster of decapsulation nodes, including receiving an assigned address from the decapsulation node;
    prior to failure of the primary session, initializing a redundant session with a redundant decapsulation node in the cluster of decapsulation nodes;
    transmitting encapsulated data to and receiving encapsulated data from the decapsulation node until a failure is detected; and
    upon detection of the failure and the assigned address being associated with the redundant decapsulation node, transmitting encapsulated data to and receiving encapsulated data from the redundant decapsulation node instead of the primary decapsulation node.

2. The method of claim 1, wherein the encapsulation node is implemented at a client.

3. The method of claim 1, wherein the address is an Internet Protocol (IP) address.

4. The method of claim 1, wherein the failure is detected at the encapsulation node upon receipt of an error message or a time-out when attempting to transmit data to the primary decapsulation node.

5. A method for establishing a reliable communication channel between a decapsulation node among a cluster of decapsulation nodes and an encapsulation node across a communication network, the method, implemented at the decapsulation node, comprising:
    establishing a session with the encapsulation node in response a request therefrom, the request indicating whether or not the decapsulation node is to be a primary decapsulation node or a redundant decapsulation node; and
    if the decapsulation node is to be the primary decapsulation node:
        selecting an address for the encapsulation node;
        transmitting the selected address to the encapsulation node; and
        transmitting encapsulated data to and receiving encapsulated data from the encapsulation node until a failure occurs;
    if the decapsulation node is to be the redundant decapsulation node:
        maintaining the session until the failure occurs; and transmitting data to and receiving data from the encapsulation node after the failure occurs, wherein the assigned address is associated with the redundant decapsulation node for routing data to the encapsulation node.

6. The method of claim 5, wherein the address is selected from a group of addresses assigned to the decapsulation node.

7. The method of claim 6 wherein the group of addresses is categorized into a plurality of sub-groups of addresses, each of the sub-groups of addresses being associated with a corresponding one of other decapsulation nodes in the cluster of decapsulation nodes, and the address is selected from one the sub-groups of addresses based on the redundant decapsulation node.

8. The method of claim 5, wherein the address is an Internet Protocol (IP) address.

9. The method of claim 5, wherein the failure is identified when the redundant decapsulation node begins receiving data from the encapsulation node.

10. An encapsulation node configured to communicate with a cluster of decapsulation nodes across a communication network for establishing a reliable communication channel, the encapsulation node comprising:
a processor; and
memory for storing instructions, which when executed by the processor cause the processor to:
initialize a primary session with a primary decapsulation node in the cluster of decapsulation nodes, including receiving an assigned address from the decapsulation node;
prior to failure of the primary session, initialize a redundant session with a redundant decapsulation node in the cluster of decapsulation nodes;
transmit encapsulated data to and receiving encapsulated data from the decapsulation node until a failure is detected; and
upon detection of the failure and the assigned address being associated with the redundant decapsulation node, transmit data to the redundant decapsulation node instead of the primary decapsulation node.

11. A robust decapsulation node system comprising:
a plurality of decapsulation nodes, one of the plurality of plurality of decapsulation nodes to be configured as a primary decapsulation node for a corresponding encapsulation node and one or more of the plurality of decapsulation nodes to be configured as a redundant decapsulation node for the encapsulation node;
a router configured to route data between the plurality of decapsulation nodes and a network; and
a mapping table for use by the router to associate an address of the encapsulation node with the primary decapsulation node, the mapping table configured to be updated to associate the address of the encapsulation node with one of the one or more redundant decapsulation nodes upon failure of the primary encapsulation node; wherein the address is one of a group of addresses assigned to the primary decapsulation node.

12. The decapsulation node system of claim 11 wherein the group of addresses is categorized into a plurality of sub-groups of addresses, each of the sub-groups of addresses being associated with a corresponding one of other decapsulation nodes in the plurality of decapsulation nodes, and the address is assigned to the encapsulation node from one the sub-groups of addresses based on the redundant decapsulation node.

13. The decapsulation node system of claim 12, wherein the address is an Internet Protocol (IP) address.

14. The decapsulation node system of claim 11, wherein each of the plurality of decapsulation nodes can be configured as the primary decapsulation node for the encapsulation node and as the redundant decapsulation node for other encapsulation nodes.

15. The decapsulation node system of claim 11, wherein mapping table is further configured to associate the address of the encapsulation node with the primary decapsulation nodes upon recovery.

16. The decapsulation node system of claim 11, wherein the failure is identified when the redundant decapsulation node begins receiving data from the encapsulation node.

17. The decapsulation node system of claim 11, further comprising a decapsulation node failure detector configured to detect the failure at the primary decapsulation node and restart the primary decapsulation node.

* * * * *